United States Patent [19]

Evers

[11] 4,295,922

[45] Oct. 20, 1981

[54] TUBE SIDE SEAM HEAT SEALER

[75] Inventor: Jack R. Evers, Torrance, Calif.

[73] Assignee: Developak Corporation, Redondo Beach, Calif.

[21] Appl. No.: 76,449

[22] Filed: Sep. 17, 1979

[51] Int. Cl.³ .............................................. B30B 5/02
[52] U.S. Cl. .................................. 156/583.1; 53/373
[58] Field of Search ................ 156/583.1; 53/373, 479

[56] References Cited

U.S. PATENT DOCUMENTS

| | | | |
|---|---|---|---|
| 2,955,643 | 10/1960 | Shapero et al. | 156/581 X |
| 2,956,611 | 10/1960 | Jendrisak | 156/228 |
| 3,154,901 | 11/1964 | Hayward | 53/373 |
| 3,431,700 | 3/1969 | Rausing et al. | 53/552 |
| 3,668,815 | 6/1972 | Henry et al. | 53/551 X |
| 3,986,921 | 10/1976 | Putnam | 156/583.1 |
| 4,167,435 | 9/1979 | Olschewski | 156/583.1 |

Primary Examiner—David A. Simmons
Attorney, Agent, or Firm—Charles E. Brown

[57] ABSTRACT

This relates to a heat sealer which is particularly adapted for sequentially heat sealing opposite edge portions of a web which has been formed into a tubular configuration. The heat sealer functions after each advancement of the web to seal a portion of the longitudinal side seam of the tube while a forward portion of the tube is cut off and the bottom thereof heat sealed to form a bag. The heat sealer is constructed to simultaneously form heat seals along side seams of two tubes and includes support members for supporting heat sealing members for movement together and then apart to effect the necessary heat sealing operation and then the release of the heat sealed portion. The heat sealer is carried by a wall of the machine and the support members are mounted for axial movement in unison and in opposite directions by drive means which include a fluid pressure device urging the heat sealing members to close to operative positions and a mechanical mechanism for overrriding the pressure device and urging the heat sealing members to open positions.

14 Claims, 5 Drawing Figures

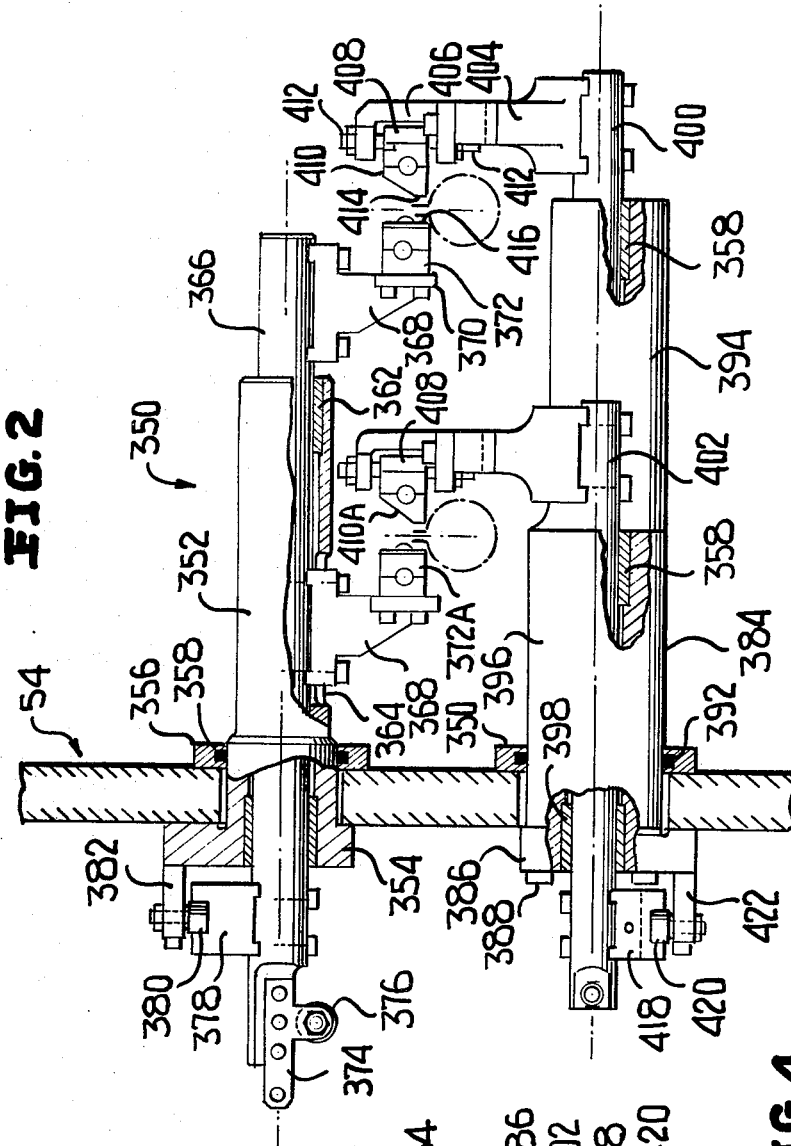
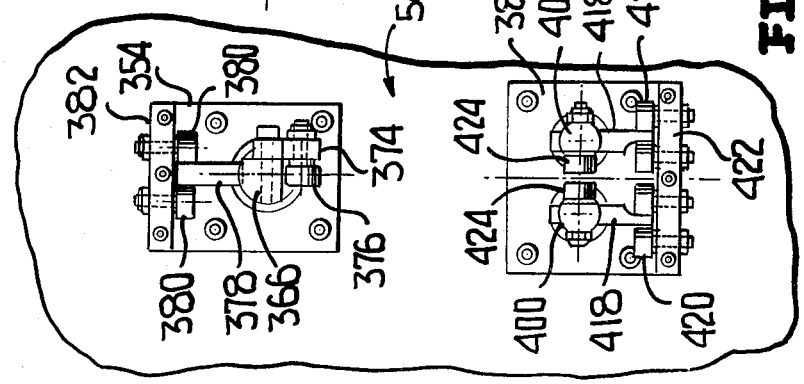

TUBE SIDE SEAM HEAT SEALER

This invention relates in general to new and useful improvements in bag making equipment and more particularly to a heat sealer for heat sealing the longitudinal side seam of a tube which has been formed from a continuous web.

In accordance with this invention the machine is provided with a main support wall which divides the machine into a sanitary part and a machinery part. The heat sealer is carried by the wall and includes a first support member which carries two heat sealing members in axially spaced relation, the heat sealing members facing in the same direction. There are also second and third support members disposed adjacent one another and parallel to each other and the first support member. The second and third support members carry heat sealing members, each of which is cooperable with one of the heat sealing members carried by the first support member. The heat sealing members are all disposed on the sanitary side of the wall.

The machinery part of the heat sealer includes a drive for axially reciprocating the first support member on the one hand and the second and third support members on the other hand in unison and in opposite directions. The drive includes a pressure device, preferably in the form of an air cylinder, which constantly urges the support members in directions to move the heat sealing members together and provides for the desired pressure clamping of the web between the heat sealing members to effect the necessary heat sealing operation. The pressure is variable by adjusting the air pressure to the fluid cylinder.

Further, in accordance with this invention, the fluid cylinder is operated at such a pressure whereby it may be overriden by a mechanical mechanism which is preferably in the form of a drive cam which so operates the drive to urge the heat sealing members apart.

With the above, and other objects in view that will hereinafter appear, the nature of the invention will be more clearly understood by reference to the following detailed description, the appended claims and the several views illustrated in the accompanying drawings.

FIG. 2 is a side elevational view of the heat sealer with parts thereof broken away and shown in section.

FIG. 4 is an end elevational view of the heat sealer as viewed at the left end thereof.

Figure 1:
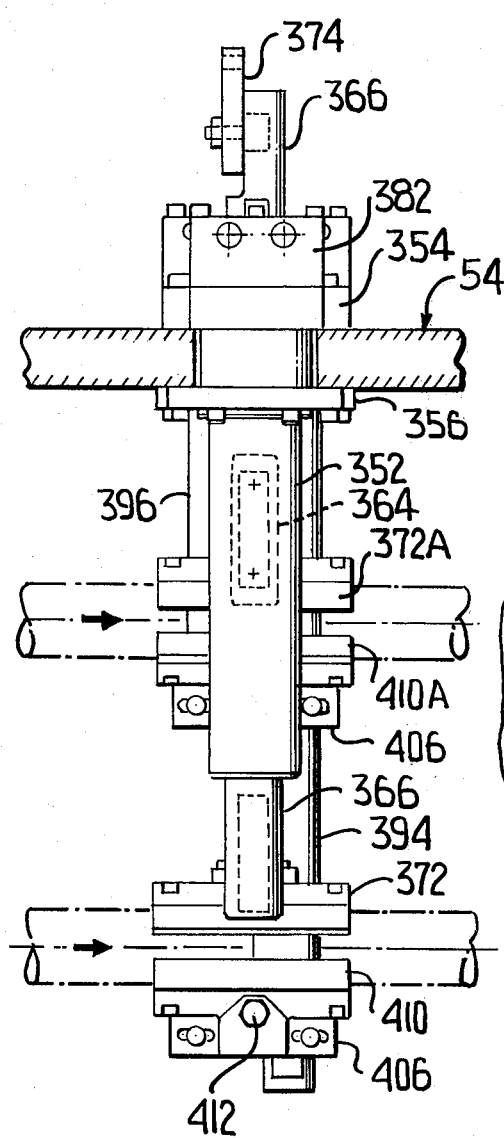
FIG. 1 is a plan view of the heat sealer and shows the general details thereof.

Referring now to the drawings in detail, it will be seen that the heat sealer, which is generally identified by the numeral 350, is carried by a combined dividing and support wall 54. With particular reference to FIG. 2, it will be seen that the heat sealer 350 includes an upper combined guide and support member 352 which is provided at the left hand thereof with a mounting flange 354. The member 352 extends through the wall 54 and is suitably secured in place by bolts. In addition, the opening through which the member 352 passes is closed by a sealing flange 356 having a sealing ring 358 mounted therein.

The combined support and guiding member 352 is of a tubular construction and is provided in the opposite ends thereof with guide bushings 360 and 362. The member 352 is continuous except for a slot 364 in the underside thereof, which slot will be described in detail hereinafter.

A support member 366 extends through the member 352 and is mounted therein for freedom of axial movement therethrough. The support member 366 has fixedly secured on the right end thereof a depending mounting bracket 368 which has a support flange 370 carrying a heat sealing element 372.

The opposite end of the support member 366 is provided with a drive member 374 which carries the cam follower 376.

An intermediate portion of the support member 366 disposed adjacent of the mounting flange 354 carries a guide plate 378 which is positioned between a pair of guide rollers 380 depending from a support plate 382 which is secured to the mounting flange 354. In this manner the support member 366 is prevented from rotating about its axis.

It is to be noted that a second mounting bracket 368 extends upwardly through the opening 364 and is secured to an intermediate portion of the support member 366. A heat sealing member 372A is carried by a mounting plate 370 of the mounting bracket 368 in the same manner as is the heat sealing member 372.

The heat sealer 350 also includes a second combined support and guide member 384. The member 384 is also provided with a flange 386 at one end thereof which abuts against the wall 54 with the member 384 extending through an opening in the wall 54. The member 384 is secured to the wall 54 by bolts 388.

The opening in the wall 54 through which the member 384 passes is also closed by a cover plate 390 having a sealing ring 392 which engages the periphery of the member 384.

The member 384 is also of a tubular construction, but differs from the member 352 in that it has two bores therethrough in side by side parallel relation. Further, the member 384 is of a stepped construction having an elongated projecting end portion 394 and a shorter portion 396. Each of the bores through the member 384 is provided at the opposite ends thereof with bushings 398. A long support member 400 extends through the long part of the member 384 while a short support member 402 extends through the short portion of the member 384. While the right hand ends of the support members 400 and 402 are axially offset, the left hand ends thereof are in alignment.

The shaft 400 has mounted on the end portion thereof projecting beyond the portion 394 of the member 384 an upstanding mounting bracket 404. The mounting bracket 404 has a generally U-shape support portion 406 in which there is positioned a holder 408 for a heat sealing member 410. The heat sealing member 410 is disposed in opposition with the heat sealing member 372 for cooperation therewith.

The holder 408 is pivotally mounted with respect to the mounting portion 406 by a pair of opposed pivot pins 412 which are vertically disposed. This mounting of the heat sealing member 410 permits a heat sealing face 414 therof to remain parallel to a heat sealing face 416 of the heat sealing member 372. It is also to be noted that an upper portion of the face of the heat sealing member 410 is cut away so that the face 414 is relatively narrow as opposed to the width of the face 416.

The end of the support member 402 also carries a bracket 404 which pivotally mounts a holder 408 which, in turn, carries a heat sealing member 410A. The heat sealing member 410A opposes the heat sealing member 372A for cooperation therewith.

The support members 400, 402, like the support member 366, are in the form of elongated circular cross sectional rods. In order to restrain each of the support members 400, 402, each support members has depending therefrom a guide plate 418 which is disposed between a pair of guide rollers 420 carried by a mounting plate 422 which is bolted to the mounting flange 386.

The ends of the support members 400, 402 carry opposed cam followers 424, as is best shown in FIG. 4.

Figure 5:
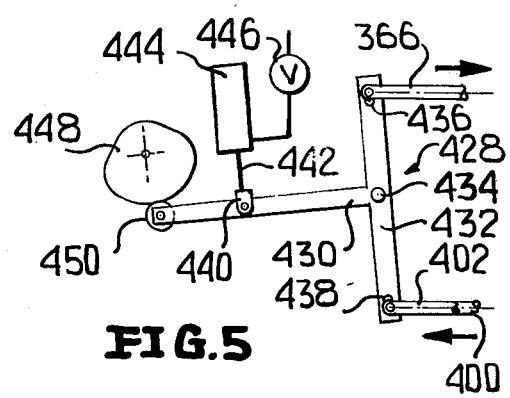
FIG. 5 is a schematic view showing the drive for the heat sealer.
Figure 3:
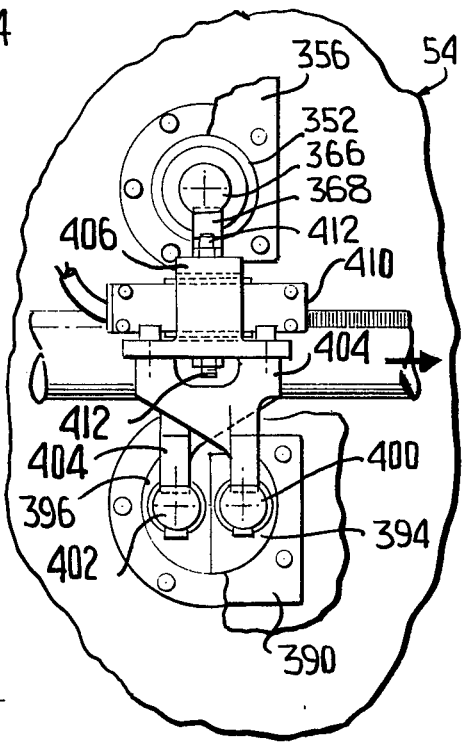
FIG. 3 is an end elevational view of the heat sealer as viewed at the right end thereof.

Referring now to FIG. 5 in particular, it will be seen that there is illustrated the drive for the heat sealer 350, the drive being generally identified by the numeral 426 and being only schematically illustrated. The drive 426 includes a generally T-shaped drive crank 428 including a stem 430 and a cross bar 432. The crank 428 is pivotally mounted on a horizontal pivot 434 and the upper end of the cross bar 432 is provided with a slot 436 receiving the cam follower 376.

The lower end of the cross bar 432 is provided with a slot 438 which receives the cam followers 424.

The stem 430 has connected thereto by means of a fitting 440 a piston rod 442 of a fluid cylinder 444 which is preferably an air cylinder. The fluid cylinder 444 has connected thereto a fluid line in which there is a fluid pressure control valve 446 wherein the pressure of fluid within the fluid cylinder 444 may be controlled. By controlling the pressure of the fluid introduced into the cylinder 444, the force exerted by the heat sealing members may be controlled.

It is to be understood that the fluid cylinder 444 effects the closing movement of the heat sealing members. The heat sealing members are, however, moved apart by a mechanical means which preferably is in the form of a cam 448 which engages a cam follower 450 also carried by the stem 430. It is to be understood that the cam 448 is rotated in timed relation to the feeding of a web in the forming of a tube. It is also to be understood that side edges of the web, which extend vertically between each pair of heat sealing members, are disposed between the heat sealing surfaces 414, 416 of each set of heat sealing members. Normally the cam 448 holds the heat sealing members in spaced relation, as is shown in FIG. 2. However, after the web has been advanced and a partially formed tube section has been aligned with the heat sealing members, the cam 448 is driven to permit the fluid cylinder 444 to urge the heat sealing members together and effect a heat sealing together of the edge portions of the web under controlled pressure as determined by the air pressure directed to the fluid cylinder. The dwell of the cam 448 controls the time of heat sealing contact with the web edge portions.

It is to be understood that the manner in which the web is shaped and advanced is not a part of this invention and no attempt will be made to describe the same in detail. It is, however, to be understood that the web will be rigidly supported by a suitable core structure (not shown) at the time the edge portions of the web are heat sealed together.

Although only a preferred embodiment of the invention has been specifically illustrated and described herein, it is to be understood that minor variations may be made in the heat sealer without departing from the spirit and scope of the invention, as defined by the appended claims.

I claim:

1. A heat sealer comprising first and second support members, mounting means mounting said support members in parallel relation for axial movement, opposed heat sealing members carried by said support members, drive means interconnecting said support members for axial movement in unison; and said drive means including fluid pressure means urging said support members to positions wherein said heat sealing members are in closed operative positions, and selectively operable mechanical means operable to overcome said fluid pressure means and to move said support members to positions separating said heat sealing members for receiving an article to be heat sealed therebetween.

2. A heat sealer in accordance with claim 1 wherein each of said support members is an elongated circular cross sectional rod, and said mounting means includes guide means for preventing rotation of each of said support members about its axis.

3. A heat sealer in accordance with claim 2 wherein said guide means includes a guide bar on each of said rods, and guide rollers engaging opposite sides of said guide bar.

4. A heat sealer in accordance with claim 3 wherein said mounting means for each rod includes an elongated guide sleeve, and said guide rollers are mounted on said guide sleeve at one end thereof.

5. A heat sealer in accordance with claim 1 where at adjacent ends of said support members there are mounting brackets, and said heat sealing members being carried by said mounting brackets in opposed aligned relation.

6. A heat sealer in accordance with claim 5 wherein at least one of said heat sealing members is mounted for pivotal movement to assure face surfaces of said heat sealing members being in parallel relation.

7. A heat sealer in accordance with claim 1 wherein said heat sealer is a heat sealer for longitudinal side seams of tube formed from a web of heat sealable material.

8. A heat sealer in accordance with claim 1 wherein another heat sealing member is carried by an intermediate portion of said first support member, there is a third support member mounted immediately adjacent said second support member, and a further heat sealing member is carried by said third support member in opposed relation to said another heat sealing member for cooperation therewith.

9. A heat sealer in accordance with claim 8 wherein said drive means are coupled to said third support member for moving said third support member in unison with and in the same direction as said second support member.

10. A heat sealer in accordance with claim 1 wherein said fluid pressure means includes a variable pressure fluid source for controlling the sealing pressure applied by said heat sealing members.

11. A heat sealer in accordance with claim 1 wherein said fluid pressure means includes a variable pressure fluid source for controlling the sealing pressure applied by said heat sealing members, and said fluid pressure means includes a fluid cylinder.

12. A heat sealer in accordance with claim 1 wherein said heat sealer is carried by a machine wall which both divides the machine into a sanitary portion and a machinery portion, said mounting means being carried by said wall with said heat sealing members being in said sanitary portion and said drive means being in said machinery portion.

13. A heat sealer in accordance with claim 1 wherein mechanical means is of the cam actuated type.

14. A heat sealer in accordance with claim 1 wherein mechanical means is of the cam actuated type and directly acts on a lever positioned by said fluid pressure means.

* * * * *